UNITED STATES PATENT OFFICE.

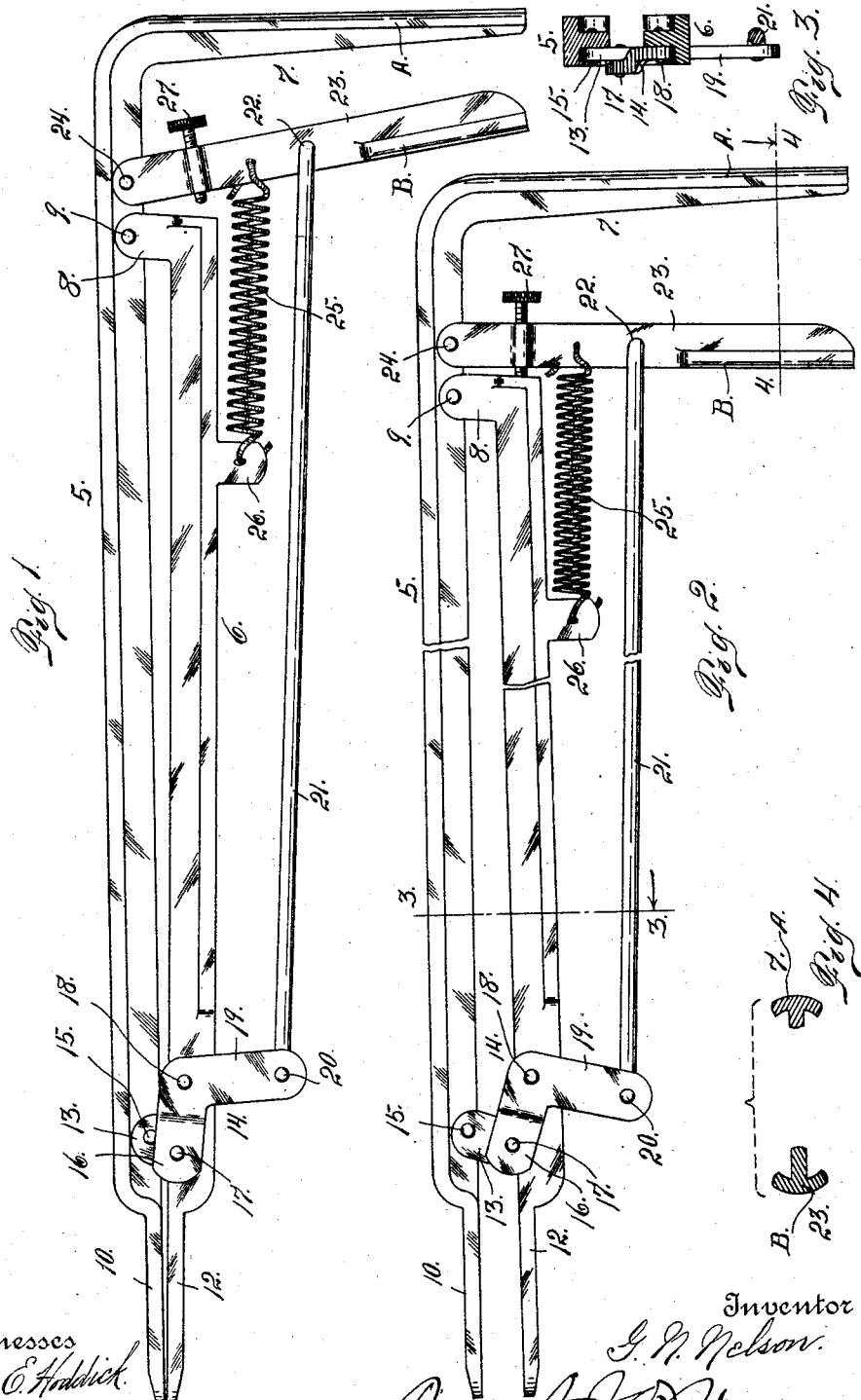

GUSTAF N. NELSON, OF DENVER, COLORADO.

WEED-PULLER.

No. 901,820.　　　Specification of Letters Patent.　　　Patented Oct. 20, 1908.

Application filed March 23, 1908. Serial No. 422,842.

*To all whom it may concern:*

Be it known that I, GUSTAF N. NELSON, a citizen of the United States, residing in the city and county of Denver and State of Colorado, have invented certain new and useful Improvements in Weed-Pullers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in weed pullers, my object being to provide a device adapted for use in pulling or uprooting noxious weeds as dandelions in lawns or other locations where the extermination of weeds is desirable or necessary.

My improved device consists of a pair of members pivotally connected near their upper extremities and having a toggle joint connection near their lower extremities which are formed into weed pulling jaws. The connection of the two members is such as to cause the two jaws to maintain a parallel or approximately parallel position throughout their length when closed thus giving a considerable weed grasping surface whereby a firm hold of the root may be obtained. A rod connects one member of the toggle with a handle pivotally attached to one of the main members. This handle is spring-actuated whereby the two jaws are held normally in the open position.

Having briefly outlined my improved construction, I will proceed to describe the same in detail reference being made to the accompanying drawing in which is illustrated an embodiment thereof.

In this drawing, Figure 1 is a side elevation of my improved device showing the jaws in the closed position. Fig. 2 is a similar view showing the jaws in the open position. Fig. 3 is a section taken on the line 3—3 Fig. 2 viewed in the direction of the arrow. Fig. 4 is a section taken on the line 4—4 Fig. 2 looking in the direction of the arrow.

The same reference characters indicate the same parts in all the views.

Let the numerals 5 and 6 designate the two main members of the device. The member 5 is provided with a handle part 7 extending approximately at right angles to the body of the member. The member 6 is provided at its upper extremity with a short arm 8 which is pivotally connected with the member 5 as shown at 9. The lower extremity of the member 5 is provided with a flat jaw 10 coöperating with a similar jaw 12 forming a part of the member 6. The members 5 and 6 are further connected just above the jaws 10 and 12 by a link 13 and a bell crank lever 14. The link is pivotally connected with the member 5 as shown at 15 and with an arm 16 of the bell crank lever as shown at 17. The lever 14 is fulcrumed on the member 6 as shown at 18 while its arm 19 is pivotally connected as shown at 20 with a rod 21 whose opposite extremity is movably connected as shown at 22 with an operating handle member 23 pivoted on the member 5 as shown at 24. This handle member 23 is connected by means of a spring 25, with a lug 26 formed on the member 6. Normally the spring maintains the members in the position shown in Fig. 2 of the drawing whereby the jaws 10 and 12 are open or separated to their limit of movement. The degree or width to which the jaws may open is controlled by an adjusting screw 27 which is threaded through the handle member 23 and normally engages the upper extremity of the member 6.

The members 5 and 6 are preferably T-shaped in cross section (see Fig. 3) while the handle members 7 and 23 are curved or rounded, the one upon its upper surface and the other upon its lower surface as shown at A, B respectively (see Fig. 4).

From the foregoing description the use and operation of my improved device will be readily understood. Assuming that the operator desires to pull a weed, the jaws 10 and 12 when in their open position are inserted in the ground whereby the jaws are on opposite sides of the root or weed to be removed. The jaws are then closed on the root by the operator who presses the handle member 23 toward the member 7, thus causing the jaws to close by virtue of the connection between the handle member 23, the bell crank lever 14 and the link 13 as heretofore described. The instrument is then drawn upwardly carrying the weed or plant with it as will be readily understood. It is evident that by adjusting the screw 27 whereby its lower extremity shall protrude, a longer or shorter distance through the handle member 23, the width to which the jaws are allowed to open may be readily controlled.

Having thus described my invention, what I claim is:

1. A weed puller comprising two main members having coöperating jaws at their lower extremities and pivotally connected above the jaws, two handle members, one being rigid with one of the main members, while the other is pivotally connected therewith, a rod connected with the pivoted handle member, and an operative connection between the rod and the two main members at a point between the jaws and the pivotal connection of the said members, whereby as the pivoted handle member is actuated, the jaws of the two handle members are caused to close, substantially as described.

2. In a device of the class described, the combination of two main members having jaws at their lower extremities and pivotally connected together above the jaws, two coöperating handle members, one being rigidly connected with a main member and the other pivotally connected therewith, and an operative connection between the pivoted handle member and the two main members at a point between the jaws and the pivotal connection of the two main members, substantially as described.

3. The combination of two main members having coöperating jaws at their lower extremities, the said members being pivotally connected together above the jaws, two handle members, one being rigid with one of the main members and the other pivotally connected therewith, a rod attached at one extremity to the pivoted handle member, a link and lever connection between the two main members at a point below the pivotal connection of the two members, the lever being connected with the opposite extremity of the said rod, substantially as described.

4. A device of the class described, comprising two main members having jaws at their lower extremities and pivotally connected above said jaws, two handle members, one rigidly connected with one main member, and the other pivotally connected therewith, a suitable connection between the pivoted handle member and the two main members below their pivotal connection, and a spring connecting the pivotal handle member with one of the main members and normally acting to hold the jaws in the open position, substantially as described.

5. A device of the class described, comprising two main members having jaws at their lower extremities and pivotally connected above said jaws, an operating handle member pivotally connected with one of the main members, and an operative connection between the pivoted handle member and the two main members below the pivotal connection of the latter whereby as the handle member is actuated the main members are operated, substantially as described.

In testimony whereof I affix my signature in presence of two witnesses.

GUSTAF N. NELSON

Witnesses:
A. J. O'BRIEN,
DENA NELSON.